United States Patent [19]

Gaiser

[11] Patent Number: 4,822,159
[45] Date of Patent: Apr. 18, 1989

[54] SADDLE-SHAPED SPECTACLE BRIDGE

[76] Inventor: Hans Gaiser, Thuring Strasse 19, 7410 Reutlingen 24, Fed. Rep. of Germany

[21] Appl. No.: 481,781

[22] Filed: Apr. 4, 1983

[30] Foreign Application Priority Data

Apr. 5, 1982 [DE] Fed. Rep. of Germany ....... 3212686

[51] Int. Cl.$^4$ ............................................. G02C 5/02
[52] U.S. Cl. ................................... 351/124; 351/131; 351/136
[58] Field of Search ............... 351/124, 125, 126, 128, 351/129, 131, 138, 141, 136, 137, 139

[56] References Cited

U.S. PATENT DOCUMENTS

| 2,354,603 | 7/1944 | Malcom | 351/131 |
| 2,582,345 | 1/1952 | Moeller | 351/136 |
| 4,243,306 | 1/1981 | Bononi | 351/136 |

Primary Examiner—Rodney B. Bovernick
Assistant Examiner—P. M. Dzierzynski

[57] ABSTRACT

It is proposed to embed in a saddle-shaped spectacle bridge made of silicone and provided with two wings, a cross member connecting the wings, respectively one spectacle rim groove in the frontal external longitudinal zone of the wings—the groove having a bottom surface and a rear surface which is approximately vertical thereto—and with a fastening hole which is provided in the cross member from the front thereof a metal spring, whose cross-section extends in the shape of a bell, with the cross piece thereof in the cross head and to provide the two legs thereof, which have a curvature to the outside, in a wing each as a ridge, the untensioned position of the spring having a greater dimension of expansion than corresponds to the position of use of the saddle-shaped bridge and the spring being arranged behind the groove.

14 Claims, 5 Drawing Sheets

SADDLE-SHAPED SPECTACLE BRIDGE

The invention relates to a saddle-shaped spectacle bridge made of silicone of a Shore-D hardness of 10–30 having two wings, a cross member connecting the wings, a spectacle rim groove in the frontal external longitudinal zone of each wing, the groove having a bottom surface and a rear surface which is approximately vertical thereto, and a fastening hole in the cross member in the front thereof.

BACKGROUND OF THE INVENTION

Such a saddle-shaped bridge is known from U.S. Pat. No. 4,234,306, which issued Jan. 6, 1981 to Walter H. Bononi, FIGS. 1 and 2. These saddle-shaped bridges consist of a silicone rubber, the softness of which is comparable to that of the skin, in other words which is considerably softer than what is usually called non-rigid plastics material. On the one hand, this extreme softness, together with colourlessness and resistance to aging, in the field under discussion is very pleasant for the skin, even if the skin is sensitive. On the other hand, the fastening of such soft objects causes difficulties. The thinking behind this is that the saddle-shaped bridge will be connected to the spectacle frame not only for a short time but that, while being produced on a large-batch scale and being of high quality, the connection is meant to last, even if it is subjected to extremely severe stress, such as occurs in sport, military service, etc.

Saddle-shaped bridges made of acetate were previously glued to the spectacle frame. However, such a clip connection does not last with the very soft saddle-shaped bridge. The wings of the saddle-shaped bridge become detached from the pins very soon unless gluing was effected in an extremely careful manner. Furthermore, if an impact stress occurs, the pins can penetrate the wings and may pierce the skin.

OBJECT AND STATEMENT OF THE INVENTION

It is the object of the invention to indicate a saddle-shaped bridge which, although it has the known softness and general shape, is effectively retained on the spectacle frame. The good appearance of the saddle-shaped bridge is furthermore to be maintained, and the shape thereof is to be simple.

According to the invention, this problem is solved by the following features:

(a) A metal spring extends in the shape of a bell having a cross piece embedded in the cross member and has two legs which have a curvature towards the outside, each leg extends in a wing as a ridge.

(b) The untensioned position of the spring has a greater dimension of expansion than corresponds to the position of use of the saddle-shaped bridge, and (c) The spring is located behind the grooves.

The spring—narrow itself—virtually does not present any interference in relation to utilizing the softness. The saddle-shaped bridge stays in its position, despite the forces acting thereon from many directions. If a wing does slip off in an exceptional situation, then even a technically extremely unskilled person can put it back in its place.

Advantageously, the invention has the following additional features:

The spring has a rectangular cross-section and the longer cross-sectional dimension is in the direction of the wings. Due to the features, one ensures that the spring is virtually invisible from the front and the spring presents a large surface in the direction in which pressure is exerted so that it cannot penetrate the soft material.

The longer cross-sectional dimension is approximately equal to the width of the bottom surface of the groove. Due to the features, one ensures that the spring is also hardly visible when viewed in the same direction or in an inclined direction. Furthermore, then its narrowness is optimum and, if normal materials, such as beryllium bronze or high-quality steel, are used, it can be produced with regard to its load deflection characteristic so that the spring force that comes about is neither too high nor too low.

The cross piece is curved according to a radius. Due to the features, one ensures that, on the one hand, points which break on account of frequent loading such as corners, are avoided. On the other hand, one prevents the cross piece from moving in the horizontal direction to the left and right in the soft material of the cross member.

The radius is 6 mm $-20\% + 30\%$. A radius like that provided very much meets the requirement to design the cross piece in such a way that it is covered by a nose bridge of normal width. The transition to the legs of the spring is brought about with soft radii.

At least one positioning pin recess is provided in the free end zones of the legs of the spring. Due to the features, it is possible to retain the spring in a tool at three points, namely these: the positioning pin recesses in the free end zones as well as in the zone of the fastening hole. If further recesses are provided there, the silicone material can flow through the eyes thus formed so that one obtains an interlocked connection of the free end zone/wing ends.

A blind hole passes from the top of the cross member to the bottom through the silicone material and coaxially through the cross piece of the spring. The blind hole forms, below the cross piece, the rearmost part of the fastening hole. Due to the features, one ensures that one can provide the blind hole both for positioning the spring in the same plane as the positioning pin recesses and for inserting through the blind hole during the assembly a small screw which allows a fixed connection to the nose bridge.

The groove has, beginning at its top, a front wall which gradually transforms it from an L-shaped groove into a V-shaped groove. Due to the features, the guideway of the wings on the spectacle rim is maintained, where it is needed most, namely at the end zone of the wings and, on the other hand, the spectacle rim is then covered only over a portion of the length of the groove.

The saddle-shaped spectacle bridge is best suited for a pair of spectacles having spectacle rims made of profile wire with dimensions of between 1–4 mm., a nose bridge, and a tab provided on the rear of the nose bridge having a tapped through hole, which extends from the top to the bottom of the tab.

DESCRIPTION OF THE DRAWINGS

The invention will now be described with the aid of an exemplified embodiment. In the drawings.

DETAILED DESCRIPTION

Figure 1:
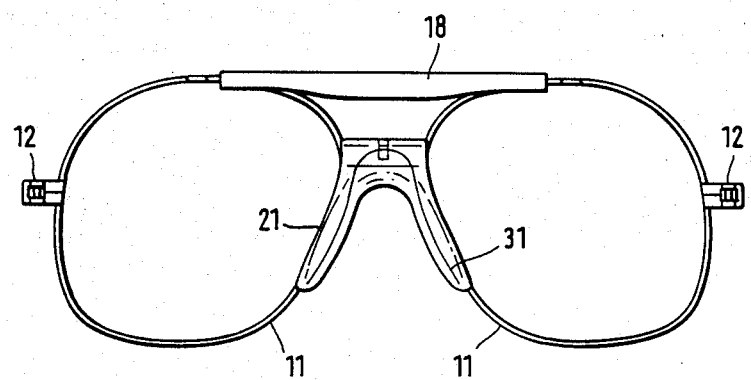
FIG. 1 shows the rear of a spectacle frame without the spectacle sides, with the saddle-shaped bridge fitted.
Figure 2:
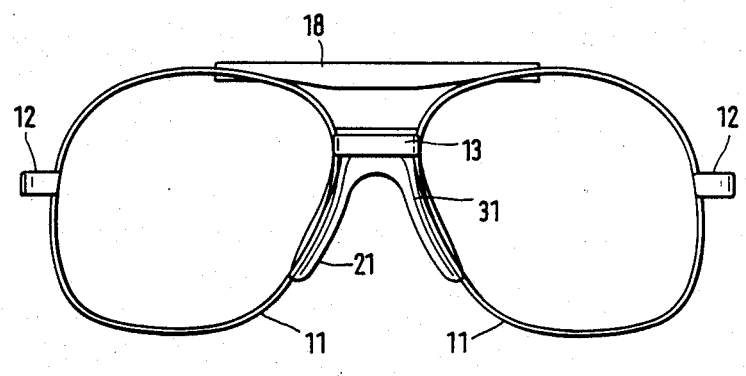
FIG. 2 shows a front view of FIG. 1.
Figure 3:
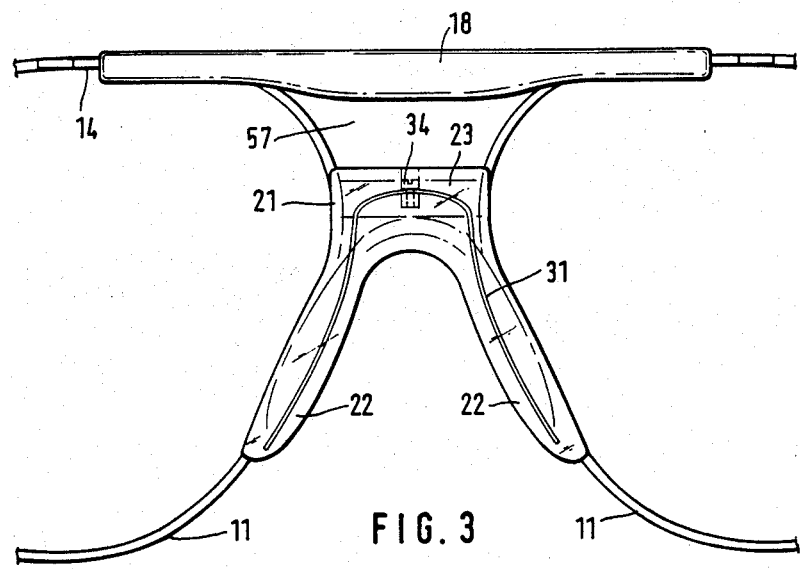
FIG. 3 shows a view similar to FIG. 1, but only of the central zone, and twice as large.
Figure 7:
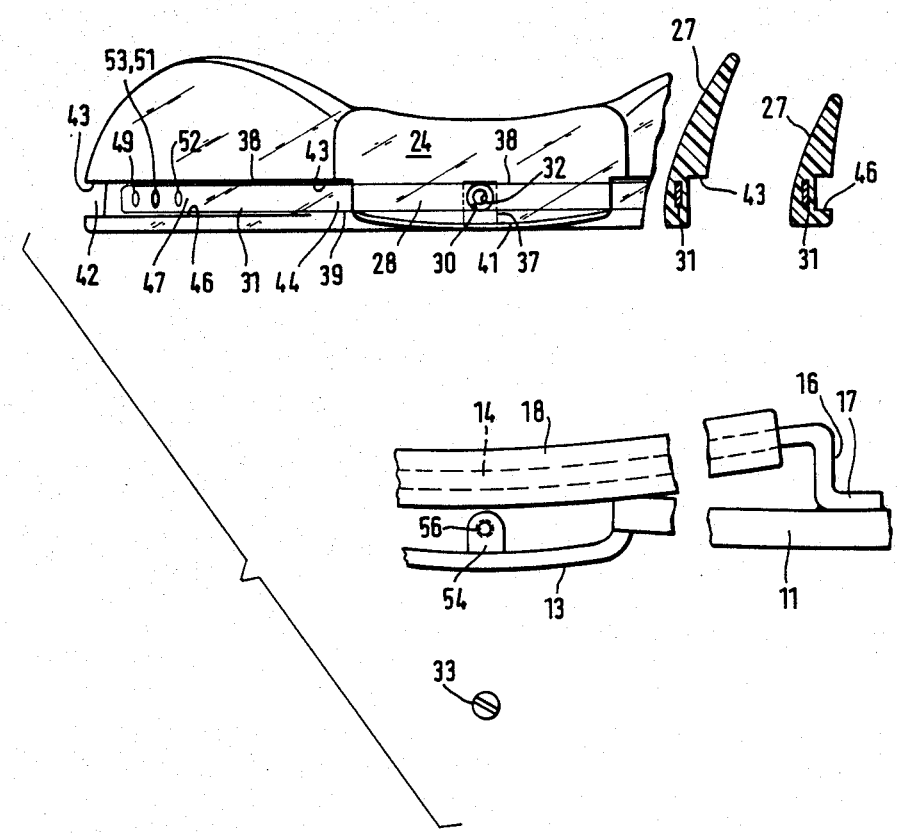
FIG. 7 shows a view according to the arrow A in FIG. 5, but only of a partial zone, as well as two cross sections through the wing showing an L-shaped and a V-shaped groove respectively and three times as large as FIG. 1.

The frame shown in FIGS. 1 and 2 looks very good on one side and can withstand considerable stresses on the other side. Its spectacle rims 11 consist of metallic profile wire, whose thickness is approximately 1 mm in the drawing plane of FIG. 1 and approximately 2 mm vertically thereto. On its internal circumference, it has the V-shaped groove that is necessary for mounting the glass disc. Laterally on the outside, there are provided the locking blocks 12, which are integral with the hinge halves. The spectacle sides are not shown. From the front, there has been soldered to the spectacle rims 11 a nose bridge 13 at its two ends, which bridge extends horizontally, as shown in FIG. 2, and has a radius of 50 to 60 mm, as shown in FIG. 7. In the eyebrow zone of the spectacle rims, and to the rear of these, there has been soldered a transverse clasp 14 which is also metallic and which, on account of two double bends 16, has two feet on either side, whose soles 17 have been soldered from the rear to the spectacle rim 11. Both for reasons of good appearance and for reasons of a weight-saving stiffening, the transverse clasp 14 has been cast into a plastics material cross piece 18. Between the plastics material piece 18 and the nose bridge 13 there is left a considerable free space 57 which, according to the true-to-scale Figures, is approximately 9 mm in dimension.

A saddle-shaped bridge 21 is symmetrical about its vertical centre surface. It has two wings 22 which merge in a cross head 23 at the top. As emerges from a comparison of FIG. 4 with FIG. 5, the widest dimension of the saddle-shaped bridge 21 is 42 mm, measured in the horizontal direction, while the widest dimension is 36 mm in the fitted state. The top 24 of the cross head 23 is at a distance of approximately 9 mm from the apex 26 of the internal supporting surface 27 of the wings 22. Provided from the top vertically downwards, but eccentrically offset to the front (FIG. 7), is a through hole 30, against which there bears from the bottom the central zone 28 of a cross piece 29 of a spring 31. The central zone 28 has a through hole 32 which is smaller in diameter. This allows the head 33 of a threaded screw 34 to pass through the through hole 27. The shank 36 of the screw 34 can pass through the through hole 32. But the underside of the head 33 rests on the zone around the through hole 32. During the production, the through hole 27 receives a first zone of a fixing pin of a mould, while the second zone of this fixing pin traverses the through hole 32. The head 33 is retained to some extent in the through hole 30 by friction so that the screw 34 can only drop out in extremely unfortunate circumstances.

Figure 5:
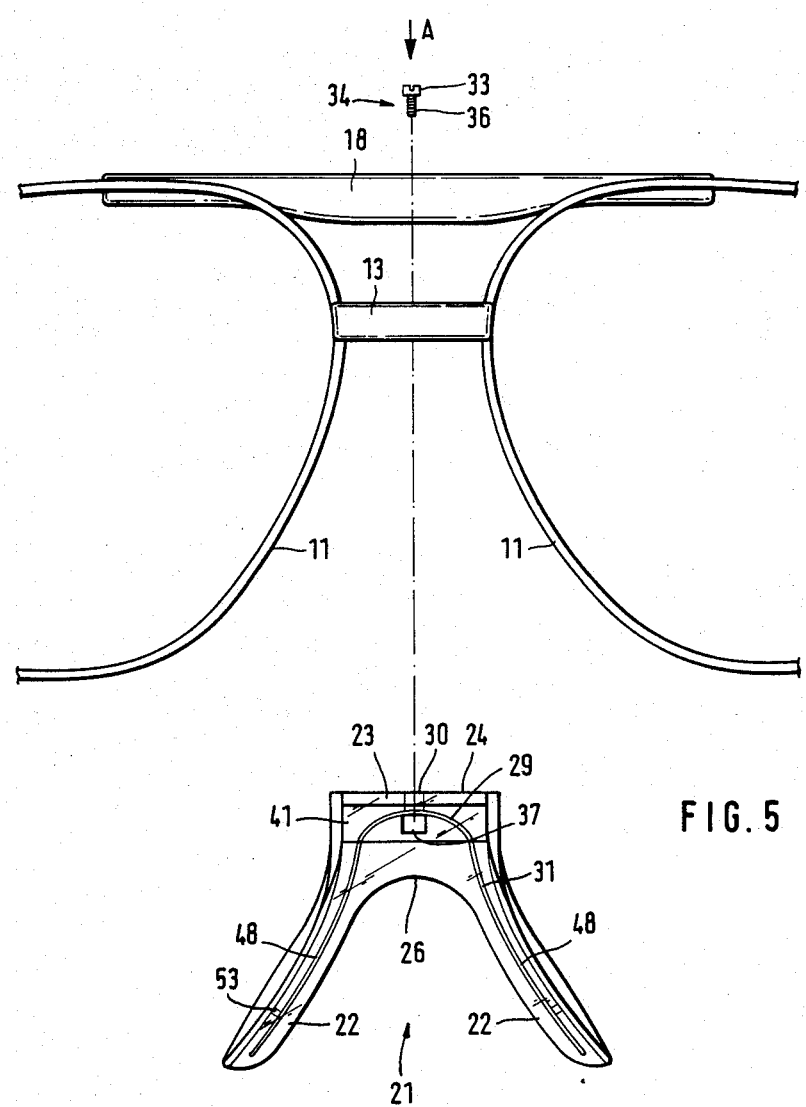
FIG. 5 shows a view like FIG. 4, but in an exploded representation.
Figure 6:
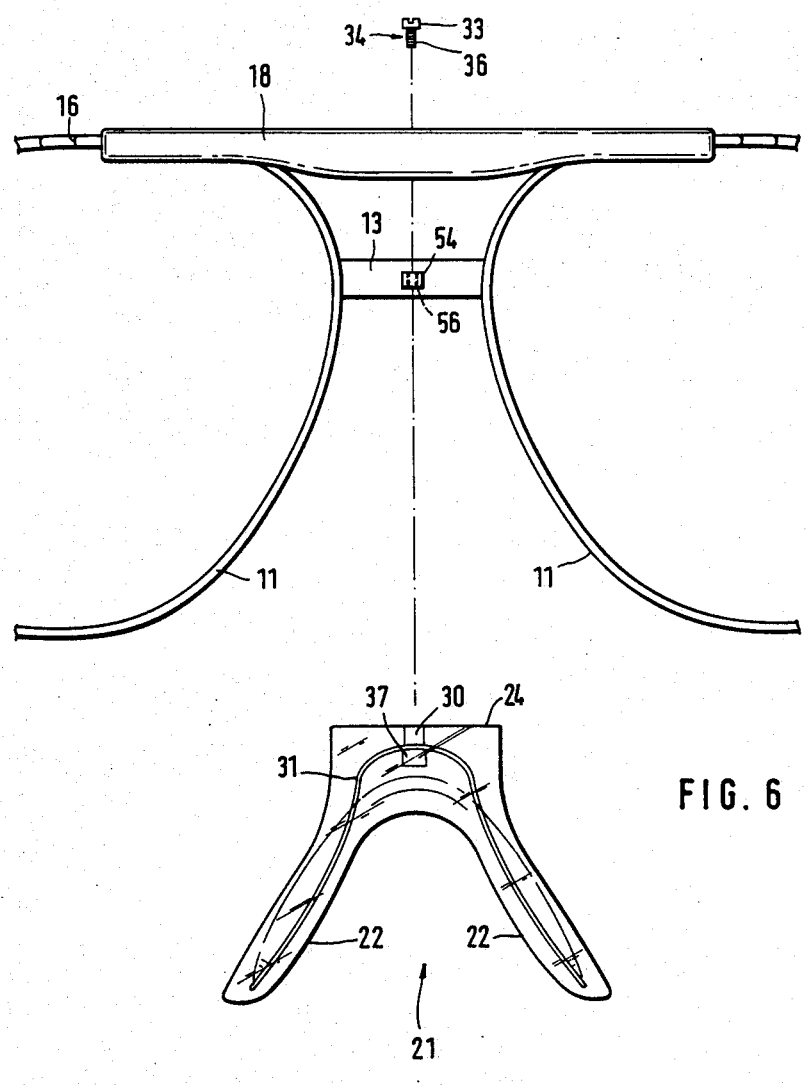
FIG. 6 shows a rear view of FIG. 5, twice as large as FIG. 1.

Below the central zone 28, and in alignment with the through holes 30, 32, there is provided a blind hole 37, which is narrow both in height and width and is rectangular in a vertical cross-section and whose rear bottom 38 is approximately aligned with the rear edge 38 of the spring 31—viewed in the direction of FIG. 7. As FIG. 7 shows, the through hole 32 lies in the centre between the rear edge 38 and the front edge 39. As FIGS. 5 and 6 show, the distance between the apex 26 and the blind hole 37 is greater than the distance between the blind hole 37 and the top 24 so that the skin is no longer aware of the blind hole 37 pressurewise. With a Shore-D hardness of 18, a distance of as little as 4 mm, drawingwise, is sufficient here.

The blind hole 37 starts centrally from a flat depression 41 which is provided in the front of the cross head 23. This depression 41 causes the nose bridge to be embedded in the cross head 23 from its rear by approximately ½ mm.

Starting from the lateral flanks of the cross head 23 in the vertical direction downwards, there extends a spectacle rim groove 42 which has, in the upper zone, only a rear wall 43 and a bottom 44 which passes through fully to the front. Approximately at the level of the apex 26, there begins to grow from the front zone a front wall 46 so that there is left, as from that point, a remaining bottom 47 which is as wide as the spectacle rim 11. The spectacle rim groove 42 gradually becomes as deep as the spectacle rim 11 is high. Below the rear zone of the bottom 44 and symmetrically below the remaining bottom 47, there are located the legs 48 of the spring 31. As FIG. 7 shows, the greater part of the volume of the wings 22 remains available for elastic bending, with the legs 48 serving approximately as the pivot point.

In the lower end zone of the legs 48, there are provided successively 3 holes 49, 51, 52. These have the same diameter as the through hole 32. The silicone rubber material extends through the holes 49, 52. The hole 51 is aligned, towards the remaining bottom 47, with a fixing pin hole 53. To this hole there does not correspond a retaining pin on the outside of the spectacle rim 11. On the contrary, this fixing pin hole 53 comes about as a result of the production method: There project into the injection mould, corresponding to the holes 51, 32, three fixing pins, on which the spring 31 is placed before the mould is closed. While the through hole 32 is utilised later, together with the through hole 30, the fixing pin hole 53 remains unused.

To the rear of the nose bridge 13 there has been soldered, centrally both with respect to the height and sides, a vertically projecting small pin 54 with its front surface. Its cross-section is rectangular and its dimension is such that it fits into the blind hole 32 with friction. When the bottom of the depression 41 abuts the rear of the nose bridge 13, a vertical tapped hole 56 simultaneously is in alignment with the through hole 32. It is then possible to screw in the screw 34 which consequently primarily retains the spring 31 on the small pin 54 and secondarily, due to the cast-in spring 31, also retains the saddle-shaped bridge 21 on the nose bridge 13 and thus also on the spectacle rim 11.

Figure 4:
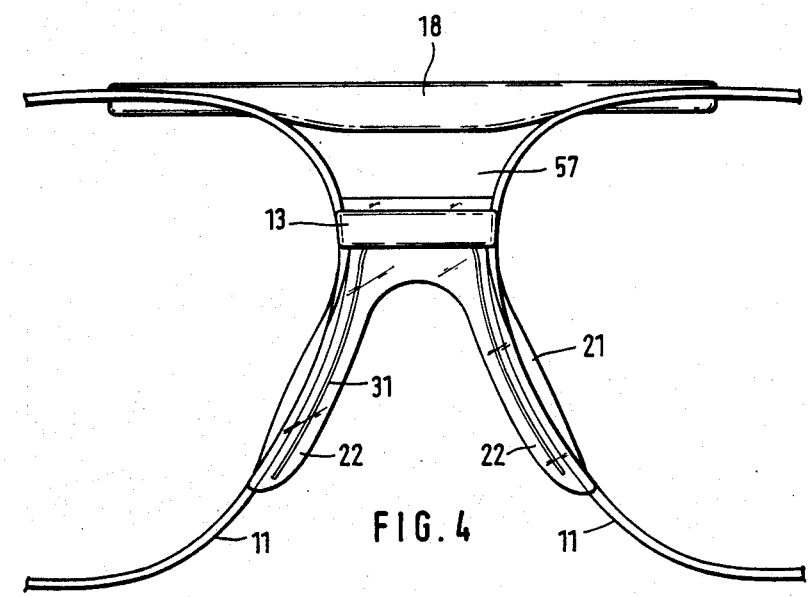
FIG. 4 shows a front view of FIG. 3, and twice as large.

As can be seen, the cross piece 29 extends almost completely behind the nose bridge 13, as shown in FIGS. 2 and 4. The rear fastening thereof cannot be seen from the front. Nor is it necessary to use the transverse clasp 14 for fastening. The cross head 23, with its colourless plastics material, projects only 1½ mm from the nose bridge 13 so that there is left a free space 57, which is beneficial for aesthetic reasons and for ventilation.

I claim:

1. In a saddle-shaped spectacle bridge made of silicone of a Shore-D hardness of 10-30 having:
   two wings,
   a cross member connecting the wings
   a spectacle rim groove in the frontal external longitudinal zone of each wing, the groove having a bottom surface and a rear surface which is approximately vertical thereto, and
   a fastening hole in the cross member in the front thereof, the improvement comprising:
   (a) a metal spring extending in the shape of a bell having a cross piece embedded in the cross member and two legs which have a curvature towards the outside, each leg extends in a wing as a ridge,
   (b) the untensioned position of the spring having a greater dimension of expansion than corresponds to the position of use of the saddle-shaped bridge,
   (c) the spring being located behind the grooves, and
   (d) a blind hole that passes from the top of the cross member to the bottom through the silicone material and coaxially through the cross piece of the spring, the blind hole forming, below the cross piece, the lowermost part of the fastening hole, into which a fastening part of the spectacles is received.

2. A saddle-shaped bridge as claimed in claim 1, wherein the spring has a rectangular cross-section and the longer cross-sectional dimension is in the direction of the wings.

3. A saddle-shaped bridge as claimed in claim 2, wherein the longer cross-sectional dimension is approximately equal to the width of the bottom surface of the groove.

4. A saddle-shaped bridge as claimed in claim 2, wherein the cross piece is curved according to a radius.

5. A saddle-shaped bridge as claimed in claim 4, wherein the radius is 6 mm −20%+30%.

6. A saddle-shaped bridge as claimed in claim 2, wherein at least one positioning pin recess is provided in the free end zones of the legs of the spring.

7. A saddle-shaped bridge as claimed in claim 1, wherein the groove has, beginning at its top, a front wall which gradually transforms it from an L-shaped groove into a V-shaped groove.

8. In a pair of spectacles having:
   spectacle rims made of profile wire with dimensions of between 1-4 mm.,
   a nose bridge,
   a tab provided on the rear of the nose bridge having a through hole which extends from the top to the bottom of the tab, and
   a saddle-shaped spectacle bridge made of silicone of a Shore-D hardness of 10-30 having:
   two wings,
   a cross member connecting the wings
   a spectacle rim groove in the frontal external longitudinal zone of each wing, the groove having a bottom surface and a rear surface which is approximately vertical thereto, and
   a fastening hole in the cross member in the front thereof, the improvement comprising:
   (a) a metal spring extending in the shape of a bell having a cross piece embedded in the cross member and two legs which have a curvature towards the outside, each leg extends in a wing as a ridge,
   (b) the untensioned position of the spring having a greater dimension of expansion than corresponds to the position of use of the saddle-shaped bridge,
   (c) the spring being located behind the grooves, and
   (d) a blind hole that passes from the top of the cross member to the bottom through the silicone material and coaxially through the cross piece of the spring, the blind hole forming, below the cross piece, the lowermost part of the fastening hole, into which the tab is received.

9. A pair of spectacles as claimed in claim 8, wherein the spring has a rectangular cross-section and the longer cross-sectional dimension is in the direction of the wings.

10. A pair of spectacles as claimed in claim 9, wherein the longer cross-sectional dimension is approximately equal to the width of the bottom surface of the groove.

11. A pair of spectacles as claimed in claim 8 or 9, wherein the cross piece is curved according to a radius.

12. A pair of spectacles as claimed in claim 11, wherein the radius is 6 mm −20%+30%.

13. A pair of spectacles as claimed in claim 8 or 9 wherein at least one positioning pin recess is provided in the free end zones of the legs of the spring.

14. A pair of spectacles as claimed in claim 8, wherein the groove has, beginning at its top, a front wall which gradually transforms it from an L-shaped groove into a V-shaped groove.

* * * * *